(12) United States Patent
Parent et al.

(10) Patent No.: US 9,829,700 B2
(45) Date of Patent: Nov. 28, 2017

(54) IMAGING SYSTEM FOR PRODUCING AN IMAGE HAVING AT LEAST ONE DISTORTED ZONE

(75) Inventors: Jocelyn Parent, Quebec (CA); Simon Thibault, Quebec (CA)

(73) Assignee: UNIVERSITE LAVAL, Quebec (CA)

( * ) Notice: Subject to any disclaimer, the term of this patent is extended or adjusted under 35 U.S.C. 154(b) by 579 days.

(21) Appl. No.: 13/488,792

(22) Filed: Jun. 5, 2012

(65) Prior Publication Data
US 2012/0314065 A1   Dec. 13, 2012

Related U.S. Application Data

(60) Provisional application No. 61/495,040, filed on Jun. 9, 2011.

(51) Int. Cl.
G02B 27/00 (2006.01)
G02B 27/18 (2006.01)

(52) U.S. Cl.
CPC ..... G02B 27/0031 (2013.01); G02B 27/0025 (2013.01); *G02B 27/18* (2013.01)

(58) Field of Classification Search
CPC .. G02B 3/005; G02B 13/026; G02B 13/0005; G02B 13/0015; G02B 13/003; G02B 13/0035; G02B 27/00; G02B 27/0025; G02B 27/0031
USPC ............... 348/148, 147; 359/291, 666
See application file for complete search history.

(56) References Cited

U.S. PATENT DOCUMENTS

| 6,147,709 A | 11/2000 | Martin et al. |
| 6,215,519 B1 | 4/2001 | Nayar et al. |
| 6,421,185 B1 | 7/2002 | Wick et al. |
| 6,452,146 B1* | 9/2002 | Barchers ............ G01J 9/00 250/201.9 |
| 6,747,813 B2 | 6/2004 | Wakai et al. |
| 6,801,370 B2 | 10/2004 | Sekiyama et al. |
| 6,865,028 B2 | 3/2005 | Moustier et al. |
| 6,898,021 B1 | 5/2005 | Tang |
| 6,977,777 B1 | 12/2005 | Wick |

(Continued)

OTHER PUBLICATIONS

Parent et al., "Locally magnifying imager", Optic Express, Mar. 11, 2011, pp. 5676-5689, vol. 19, No. 6, Washington, D.C., USA.
Wick et al., "Adaptive optical zoom", Optical Engineering Letters, Jan. 2004, pp. 8-9, 43(1), SPIE Digital Library, Bellingham WA, USA.
Laude et al., "Liquid-crystal acvice lens: application to image resolution enhancement", Optics Communications, 1999, pp. 72-78, vol. 163, Elsevier, Amsterdam, Netherlands.

(Continued)

*Primary Examiner* — Mohammed Rahaman
*Assistant Examiner* — Jimmy S Lee
(74) *Attorney, Agent, or Firm* — Fasken Martineau Dumoulin LLP

(57) ABSTRACT

There is provided an imaging system for producing an image of a scene, the image having at least one distorted zone, the imaging system comprising image producing means for producing an image of the scene; optical means for orienting light from the scene towards the image producing means, the optical means having a base optical power, the optical means being configurable to form at least one modified portion, each one of the at least one modified portion having a modified optical power different from the base optical power to thereby create at least one distorted zone on the image; and control means operatively connected to the optical means for changing the configuration of the optical means for forming the at least one modified portion. The imaging system may be reversible and provided instead as a scanning system.

19 Claims, 19 Drawing Sheets

(56) References Cited

U.S. PATENT DOCUMENTS

| | | | | |
|---|---|---|---|---|
| 2004/0189831 | A1* | 9/2004 | Shibatani | H04N 5/232 348/240.99 |
| 2005/0018279 | A1* | 1/2005 | Johnson | G02B 13/06 359/363 |
| 2005/0134610 | A1* | 6/2005 | Doyle | G06F 3/0481 345/647 |
| 2005/0152019 | A1* | 7/2005 | Mushika | G02B 26/0841 359/291 |
| 2006/0033813 | A1 | 2/2006 | Provinsal et al. | |
| 2006/0135870 | A1* | 6/2006 | Webler | A61B 5/0062 600/431 |
| 2008/0232637 | A1* | 9/2008 | Laurent | G01M 11/02 382/100 |
| 2011/0032350 | A1* | 2/2011 | Kikuchi | A61B 1/0623 348/135 |
| 2011/0096292 | A1* | 4/2011 | Saito | G02B 26/06 351/206 |
| 2013/0173194 | A1* | 7/2013 | Dholakia | G02B 27/58 702/71 |

OTHER PUBLICATIONS

Curatu et al., "Lens design and system optimization for foveated imaging", Proceedings of SPIE, 2008, 70600P, vol. 7060, SPIE Digital Library, Bellingham WA, USA.

Kuthirummal et al., "Flexible Mirror Imaging", Proceedings of IEEE Conference on Computer Vision, ICCV 2007, pp. 1-8, Rio de Janeiro, Brazil.

Parent et al., "Active imaging lens with real-time variable resolution and constant field of view", International Optical Design Conference 2010, Proc. of SPIE-OSA, Aug. 31, 2010, 76522F, vol. 7652, Bellingham WA, USA.

Parent et al., "Spatial dependence of surface error slopes on tolerancing panoramic lenses," Applied Optics, May 10, 2010, pp. 2686-2693, vol. 49 No. 14, Optical Society of America, USA.

Thibault et al., "Enhanced optical design by distortion control," Optical Design and Engineering II, 2005, pp. 1-8, vol. 5962, Proceedings of SPIE, USA.

Brousseau et al., "Linearization of the response of a 91-actuator magnetic liquid deformable mirror," Optics Express, Apr. 12, 2010, pp. 8239-8250, vol. 18 No. 8, Optical Society of America, USA.

* cited by examiner

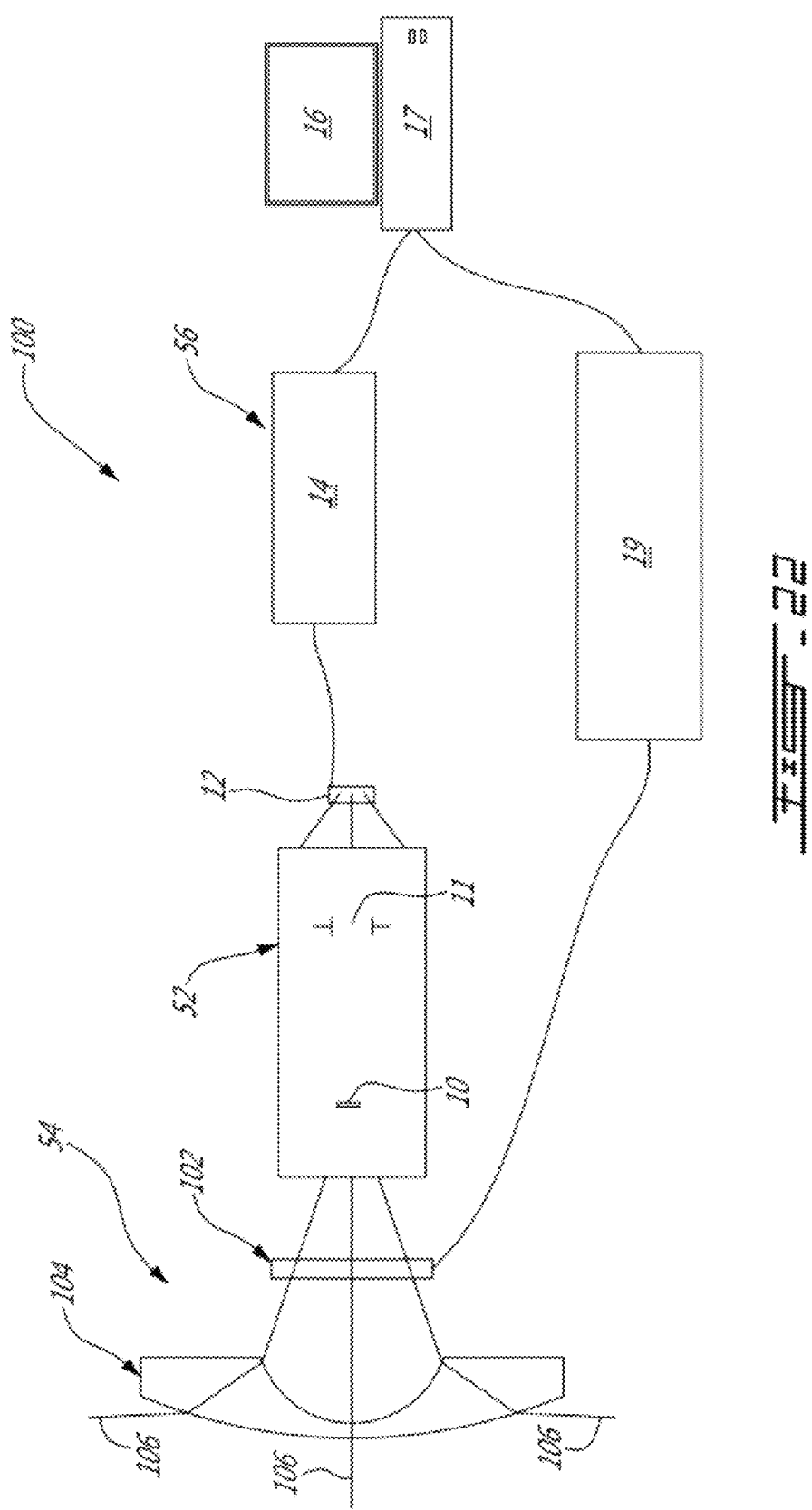

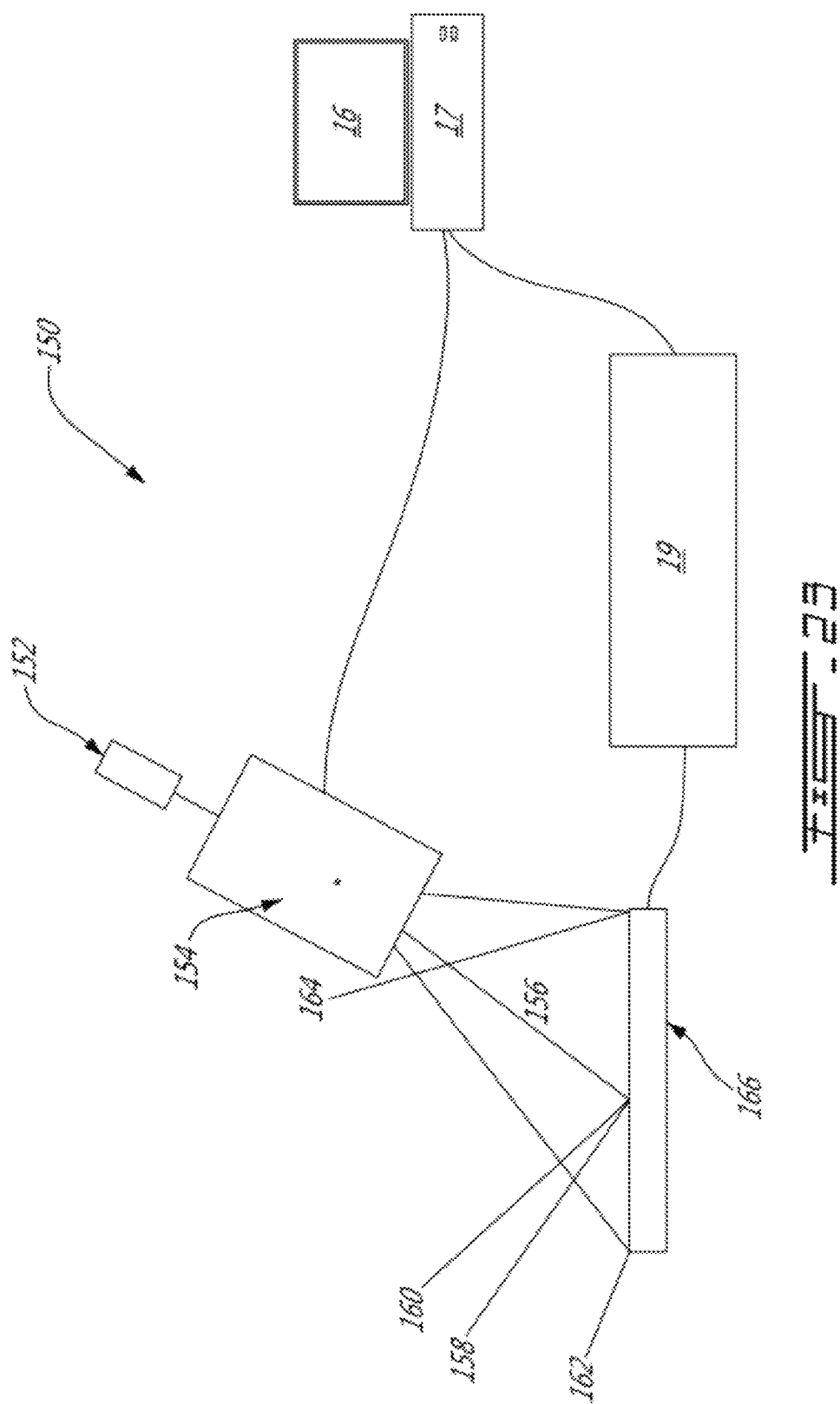

IMAGING SYSTEM FOR PRODUCING AN IMAGE HAVING AT LEAST ONE DISTORTED ZONE

CROSS-REFERENCE TO RELATED APPLICATIONS

This application claims priority under 35USC§119(e) of U.S. provisional patent application 61/495,040 filed Jun. 9, 2011, the specification of which is hereby incorporated by reference.

TECHNICAL FIELD

This invention relates to imaging systems, and particularly to an imaging system for producing an image having at least one distorted zone.

BACKGROUND OF THE ART

Traditional optical systems are used in many different applications all around the world. As an example, in security applications, a surveillance camera is often used to watch and follow a particular target like a person walking in a public place. When doing so, the analyst, may it be an automated computer or a human security officer, needs as much information as possible about the target. This thus requires better optical systems, using larger detectors and having as many detecting areas called pixels as possible receiving light from the desired target. However, as much as it is desirable to get a high quantity of pixels on the desired target, it is also useful to look at the largest scene as possible to cover a large field of view (FOV). The optical system designer is therefore confronted with a trade-off between a small FOV with a large number of pixels per degree and a larger FOV with fewer pixels per degree.

U.S. Pat. No. 6,898,021 to Tang discloses a combination of a zoom lens and a sensor for changing in real time the magnification using the zoom lens, and thus changing the FOV of the optical system. Increasing or reducing the magnification produces respectively a reduction or an increase of the FOV due to the optical invariant. The drawback is that by increasing the magnification on the desired target, the FOV is reduced and creates a blind zone. The increased magnification occurs along the optical axis.

U.S. Pat. No. 6,977,777 to Wick discloses an optical system in which a zoom lens is produced by using at least two active optics to change the magnification of the whole system by a given value. This has the same drawback of reducing the FOV when the magnification is increased and creating blind zones.

U.S. Pat. No. 6,215,519 to Nayar et al. discloses a combination of two or more imaging systems, one having a large FOV and the other a Pan/Tilt/Zoom (PTZ) lens looking directly at the target with high magnification and small FOV, in order to reduce the blind zone. Unfortunately, several cameras and lenses are needed to the expense of high data to be recorded and complex network.

Digital zooming using a sensor with a very large number of pixels is also possible. The sensor image can be displayed on various displays to view both large and narrow FOVs simultaneously. In this case, the narrow FOV is produced by a digital zoom rather than an optical zoom. Unfortunately, this system requires large format digital images to be transmitted, which increases the quantity of recorded information and requires larger bandwidth.

To reduce the size of the required bandwidth, several systems have been suggested. Some of those systems are based, for example, on the human eye which has a large FOV but a high spatial resolution at the center of the FOV due to a high concentration of photoreceptor.

For example, U.S. Pat. No. 6,421,185 to Wick et al. discloses a foveated imaging optical system that may be provided with a spatial light modulator to apply a wavefront filter to a zone in the FOV and provide a high resolution image in this zone while keeping a low resolution over the rest of the image. All the pixels of the high resolution zone in the image are transmitted, as well as a limited number of pixels from the rest of the image. Consequently, even if a high resolution sensor is required, a limited number of pixels are transmitted, limiting the required bandwidth.

U.S. Pat. No. 6,865,028 to Moustier et al. discloses a system in which, instead of using a high number of pixels on the sensor to increase the quantity of captured details, the magnification in the zone in which more information is needed is increased. Higher magnification means a high number of resolving elements or a high number of pixels are used in the zone of interest. In this system, a lens with a large FOV, with an embedded narrow FOV with a higher magnification, is used. The zone of increased magnification is obtained by a particular lens solution called Panomorph. The zone of increased magnification will use a large part of the sensor and then a large number of resolving elements or pixels. Therefore, the Panomorph solution produces a large FOV image with a higher magnification in the zone of interest. Unfortunately, the Panomorph lens is designed to provide a specific zone of interest as required by particular applications, and the zone of increased magnification is therefore fixed within the FOV. This prevents the position of the zone of increased magnification to be moved on the image.

There is therefore a need for an imaging system which would overcome at least one of the above-identified drawbacks.

SUMMARY

There is provided an imaging system for producing an image of a scene, the image having at least one distorted zone, the imaging system comprising image producing means for producing an image of the scene; optical means for orienting light from the scene towards the image producing means, the optical means having a base optical power, the optical means being configurable to form at least one modified portion, each one of the at least one modified portion having a modified optical power different from the base optical power to thereby create at least one distorted zone on the image; and control means operatively connected to the optical means for changing the configuration of the optical means for forming the at least one modified portion.

BRIEF DESCRIPTION OF THE DRAWINGS

In order that the invention may be readily understood, embodiments of the invention are illustrated by way of example in the accompanying drawings.

FIG. 22 is a schematic drawing showing an imaging system, in accordance with an alternative embodiment;

FIG. 23 is a schematic drawing showing an imaging system, in accordance with yet another embodiment.

Further details of the invention and its advantages will be apparent from the detailed description included below.

DETAILED DESCRIPTION

In the following description of the embodiments, references to the accompanying drawings are by way of illustration of an example by which the invention may be practiced. It will be understood that other embodiments may be made without departing from the scope of the invention disclosed.

Figure 1:
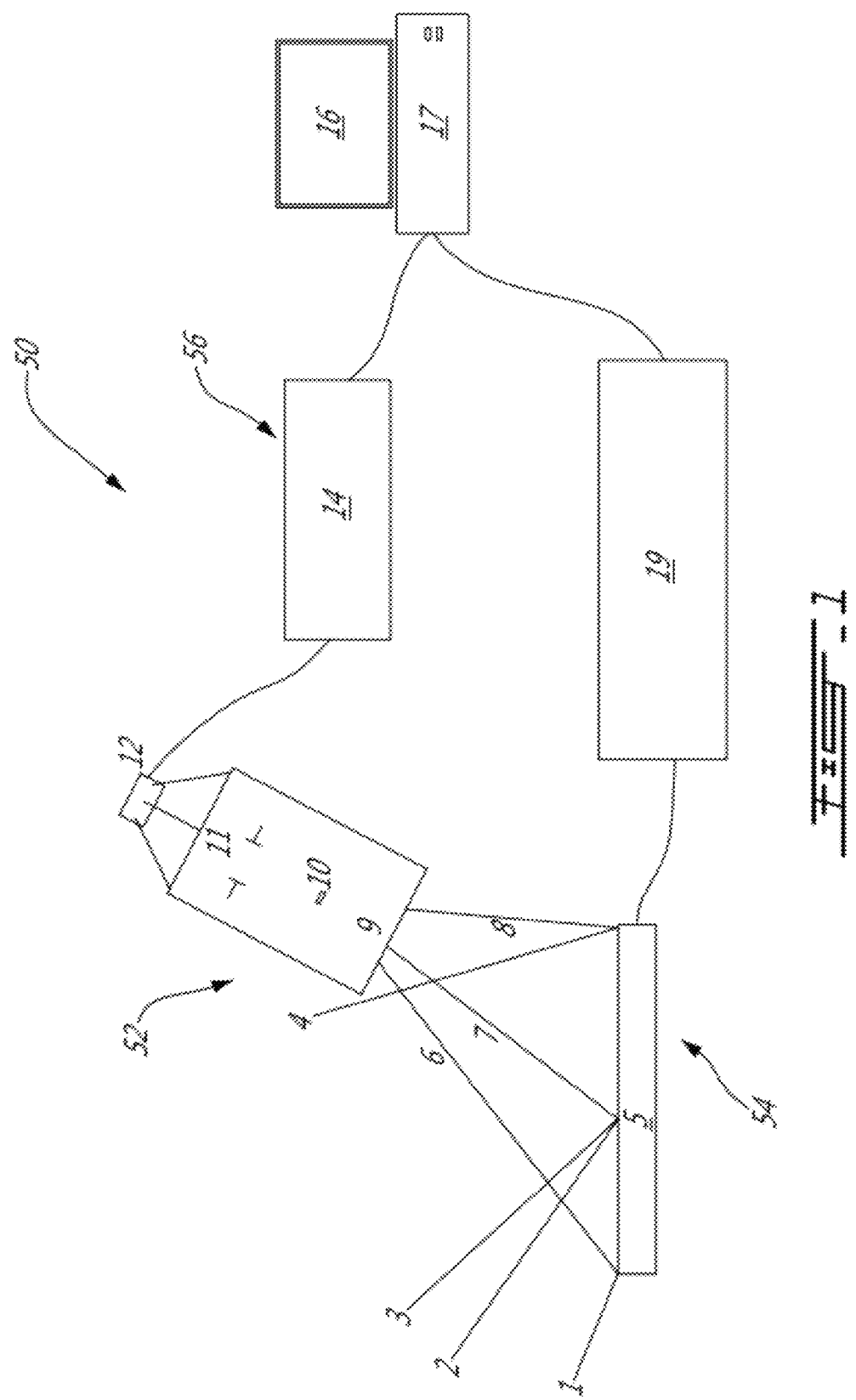
FIG. 1 is a schematic drawing showing an imaging system, in accordance with one example embodiment.

FIG. 1 shows an imaging system 50, in accordance with one embodiment. The imaging system 50 may be used for producing an image of a scene which has at least one distorted zone. In this embodiment, the imaging system 50 may further be used for processing the image, in order to re-straighten the at least one distorted zone to provide a processed image having a zone of increased or decreased magnification.

The imaging system 50 comprises image producing means 52 for producing an image of the scene and optical means 54 for orienting light from the scene towards the image producing means 52. In the illustrated embodiment, the imaging system 50 further comprises image processing means 56 operatively connected to the image producing means 52.

In the illustrated embodiment, the image producing means 52 comprises a lens system 9 having an entrance pupil 10, and an iris 11. The lens system 9 is a combination of optical means which are arranged to create the image using the light from the scene. The lens system 9 is characterized by a predetermined focal length and a predetermined f-number.

In the illustrated embodiment, the optical means 54 comprises a deformable mirror 5, which has a base optical power. This type of mirror is sometimes referred to in the art as an "active optical means". The deformable mirror 5 is positioned to reflect light from the scene towards the lens system 9. As an example, rays 1, 2, 3 and 4 are illustrated in FIG. 1 to represent light from the scene. By deforming the deformable mirror 5, it is possible to form a modified portion on the deformable mirror 5 which has a modified optical power that is different from the base optical power of the rest of the deformable mirror 5. This creates a distorted zone on the image, as will be explained below.

The image producing means 52 further comprises a detector 12 coupled to the lens system 9. The focal length of the lens system 9 is selected in such a way that the entire field of view (FOV) defined by rays 1 and 4 is imaged on the detector 12, thus creating an image of the scene on the detector 12.

In one embodiment, the field of view is comprised between 0 to 250 degrees.

In the illustrated embodiment, the image processing means 56 comprises a processing unit 14 connected to the detector 12. A screen 16 is further connected to the processing unit 14, such that the image created on the detector 12 may be transferred to the processing unit 14 and displayed on the screen 16.

The imaging system 50 further comprises control means 19 operatively connected to the deformable mirror 5 for changing the configuration of the optical means to create the modified zone on the deformable mirror 5. The control means 19 may further be adapted to modify the position and/or configuration of the distorted zone on the image, as will be explained below.

An example is used to describe operation of the imaging system 50.

When the deformable mirror 5 is in a flat configuration, for example not activated, the rays 1, 3 and 4, which come from the scene, are reflected by the deformable mirror 5 towards the lens system 9 as rays 6, 7 and 8, respectively. The focal length of the optical system composed of the lens system 9 and the deformable mirror 5 remains constant. An image of each of the rays 6, 7 and 8 is created on the detector 12. Altogether, the images of the rays 6, 7 and 8 form on the detector 12 a standard, undistorted image of the scene, as shown on FIG. 2A.

In this inactivated or undeformed configuration, the whole deformable mirror 5 has a certain optical power, or original optical power. If the deformable mirror 5 is generally flat when undeformed, the original optical power of the deformable mirror 5 may be equal to zero. Alternatively, instead of being flat, the deformable mirror 5 may originally be curved when undeformed, or have any other suitable original shape.

When the deformable mirror 5 is deformed, or activated, using the control means 19, a modified portion is formed on the deformable mirror 5. This modified portion has a shape which provides it with a modified optical power that is different from the original optical power of the rest of the deformable mirror 5.

In one embodiment for instance, the modified portion has a parabolic shape.

Figure 2:
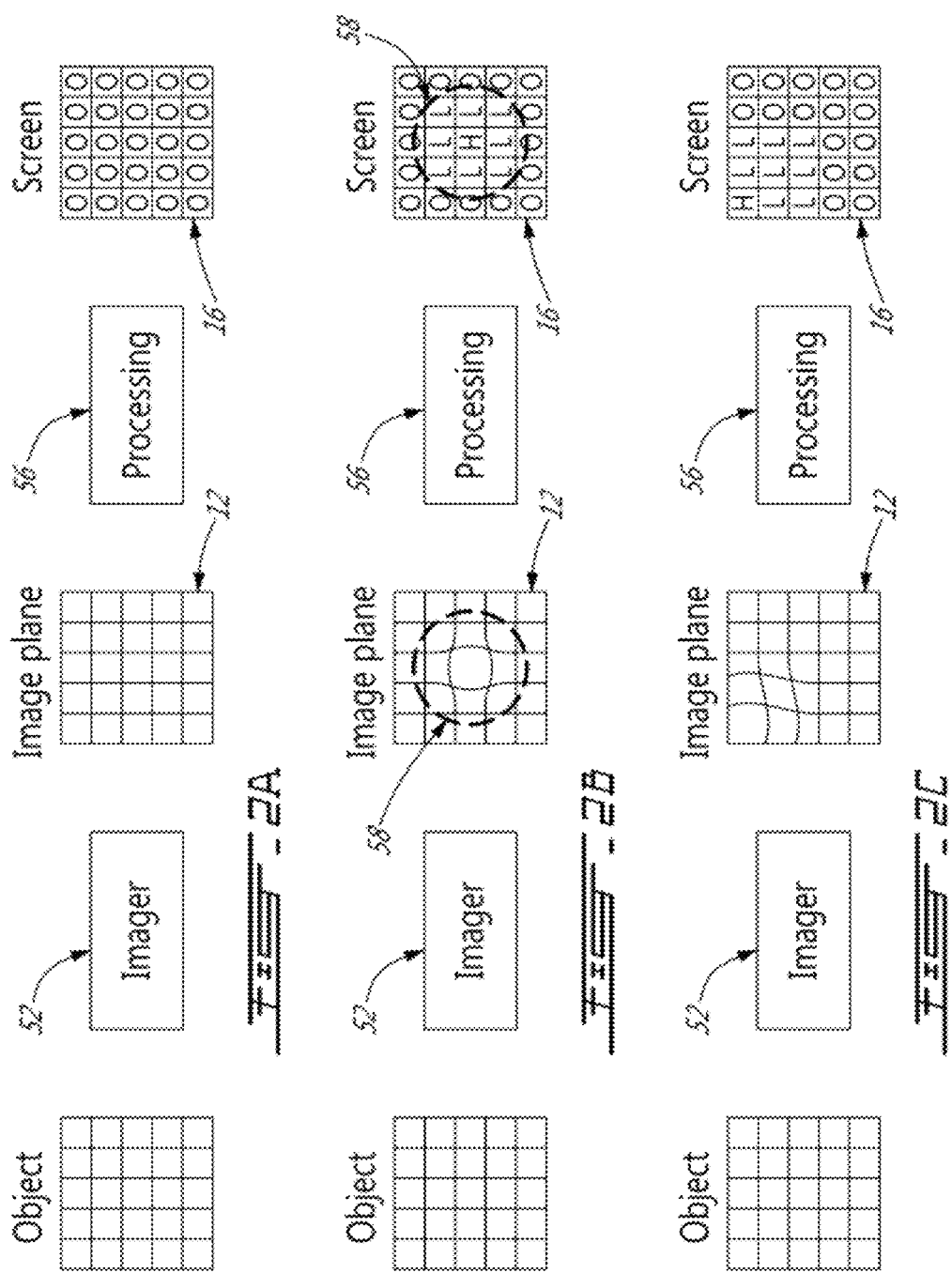
FIG. 2A is a schematic drawing showing an example of an image of a scene created by image producing means and of a processed image displayed on a screen, with the deformable mirror in a flat configuration.
FIG. 2B is a schematic drawing showing the image of the scene and the processed image shown in FIG. 2A, with the deformable mirror in a flat configuration in a first deformed configuration.
FIG. 2C is a schematic drawing showing the image of the scene and the processed image shown in FIG. 2A, with the deformable mirror in a flat configuration in a second deformed configuration.

In the illustrated example, because of the modified portion on the deformable mirror 5, ray 2, instead of ray 3, is now reflected towards the lens system 9 as ray 7. Consequently, the image of ray 7 on the detector is created by ray 2, which comes from a different direction than ray 3. This locally increases the focal length of the system composed of the lens system 9 and the deformable mirror 5, thus producing an increased magnification of the image around the image of ray 7 created on the detector 12. This causes the image to be locally distorted and thereby defines a distorted zone 58, as shown in FIG. 2B. In this configuration, the distorted zone 58 corresponding to the image of ray 7 covers a larger spatial area on the image plane than when the deformable mirror 5 is in a flat configuration. This distorted zone 58 of increased magnification may be moved at a different position in the FOV, as shown in FIG. 2C, by deforming the deformable mirror 5 differently. Depending of the mirror deformation, or activation, it is possible to create more than one zone of increased magnification by using the right shape on the deformable mirror. The shape of the deformable mirror 5 may be modified to produce various magnification changes within the FOV, or even to produce distorted zones of reduced magnification.

Around the zone of increased or relatively higher magnification, a zone of relatively lower magnification is formed, such that the FOV is advantageously kept constant, as will be further explained below.

In one embodiment, the image from the detector 12 is recorded and processed by the processing unit 14 that can re-straighten the image according to the level of distortion which was added by the deformable mirror 5, and thereby convert the distorted zone into a zone having a modified number of pixels. In one embodiment, the zone of relatively higher magnification becomes in the processed image a zone having a higher number of pixels, while the zone of relatively lower magnification becomes in the processed image a zone having a lower number of pixels, such that the processed image has the same number of pixels than the original image.

The processing unit 14 may be provided with dedicated software, but may instead comprise a suitable electronic device which does not require dedicated software. The final processed image may then be transmitted to the screen 16 where a human user can observe it and see the results, as shown in FIGS. 2A to 2C.

In FIG. 2A, the magnification is the same everywhere in the image, as denoted by O for original. In FIGS. 2B and 2C, there is a zone of relatively higher magnification H surrounded by zones of relatively lower magnification L, which are created by the distortion of the distorted zone 58. It will be appreciated that the magnification of the zone of relatively higher magnification H is generally higher than the magnification of the original image, but that the distribution of the magnification over zone H may be selected according to a desired use of the imaging system 50. For instance, in an alternative embodiment, the magnification is distributed according to a Gaussian function over the zone of relatively higher magnification H.

The imaging system 50 may further comprise a computer 17 operatively connected to the control means 19 to allow the deformable mirror 5 to be deformed as desired by the user to obtain a desired processed image.

In one embodiment, the deformable mirror 5 may be deformed in real time as the processed image is observed on the screen 16.

Alternatively, the deformable mirror 5 may be deformed automatically based on tracking algorithm and analytic requirement based applications, such as, for instance, an eye movement tracking system. The imaging system 50 may also be used to automatically track within the FOV a target of interest by allowing the zone of interest to follow the target of interest.

It will be appreciated that the deformable mirror 5 may be deformed according to various parameters in order to obtain a desired processed image. For instance, it has been found that to obtain generally constant magnification over the zone of relatively higher magnification H, the deformable mirror 5 should be deformed such that the modified portion of the deformable mirror 5 has a parabolic shape.

It will further be appreciated that deforming only a portion of the deformable mirror 5 instead of the whole deformable mirror 5 enables the original FOV to be preserved, while advantageously enabling a user to appreciate more clearly the details of a specific zone of the image. For instance, the imaging system 50 may be used in security applications to film a certain area and to magnify zones corresponding to individuals circulating in the area.

In one embodiment, the shape of the modified portion of the deformable mirror 5 is determined using calculations in order to obtain a desired magnification of the zone of relatively higher magnification H. These calculations may be performed by the control means 19, which then shapes the modified portion according to the result of those calculations.

For instance, it has been found that the following equation enables calculation of the shape of the modified portion according to a desired ratio of magnification:

$$RoM(r) = \frac{1}{1 - 2L_0 Z''(r)} \text{ if } r << L_0 \quad \text{(Equation 1)}$$

wherein:
RoM is the ratio of magnification;
r is the distance from the optical axis;
$L_0$ is the distance between the deformable mirror 5 and the entrance pupil 10; and
Z" is the curvature of the modified zone.

Examples of simulations and experiments were also performed, and the results are provided below.

Example 1—Example of a Simulation to Determine the Shape of the Deformed Mirror According to a Desired Ratio of Magnification A simulation was performed using the optical design program ZEMAX™, manufactured by Radiant ZEMAX LLC (Bellevue, Wash., USA). The simulation used a perfect paraxial lens as the image producing means 52. In this simulation, the distorted zone was provided in the center of the processed image. The following values for various parameters were chosen and inputted into the program:

| Parameter | Chosen value | Unit |
|---|---|---|
| Dimension of the zone of relatively higher magnification H | 20 | % of the total FOV |
| F-number | 18 | — |
| Focal length | 12.5 | mm |
| Distance from deformable mirror to entrance pupil | 219.19 | mm |

Figure 3:
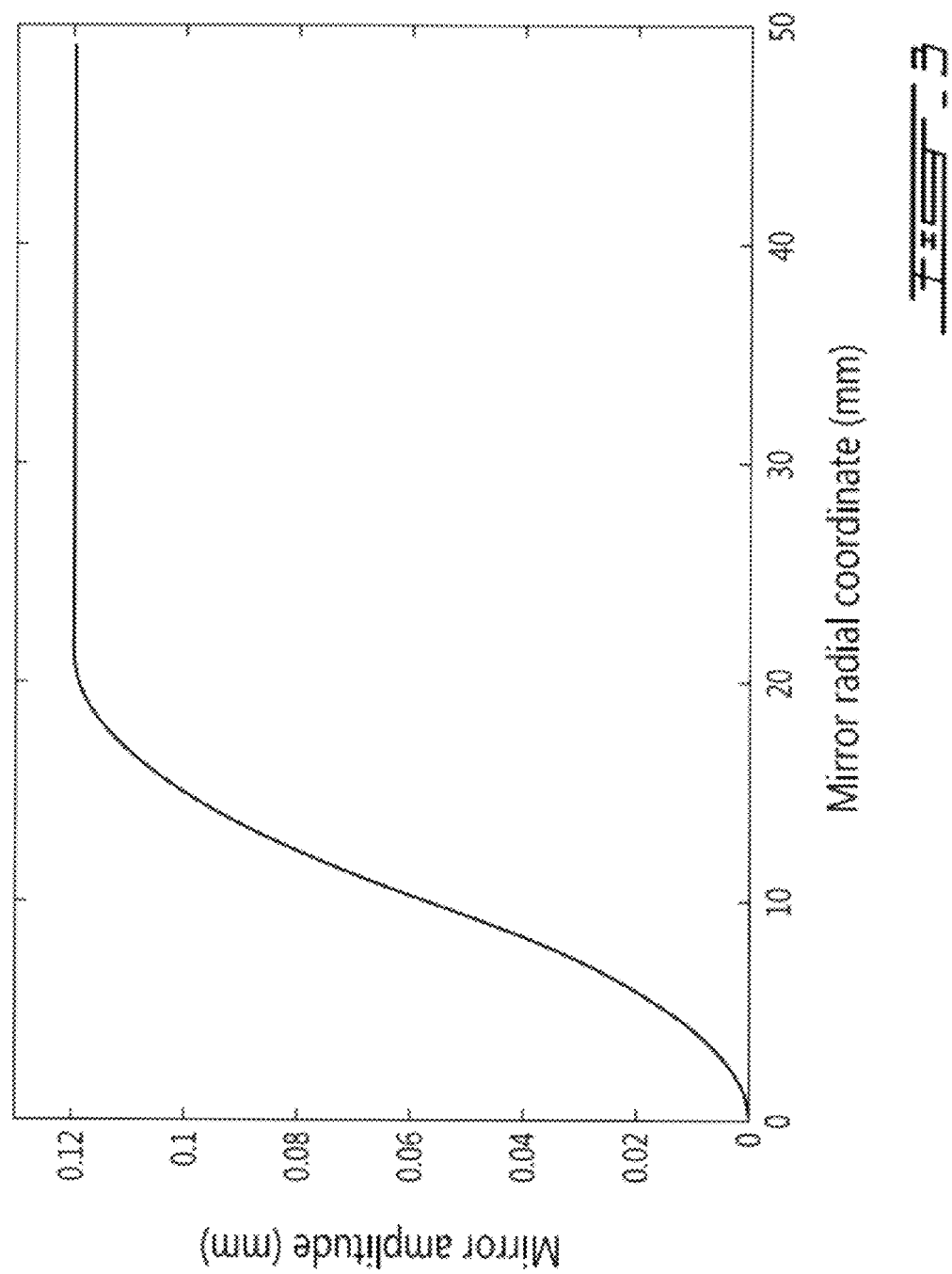
FIG. 3 is a plot corresponding to a schematic cross-section view of the deformed mirror, in accordance with EXAMPLE 1.

The shape of the deformable mirror was then chosen in order to obtain a ratio of magnification, or RoM, of 2. FIG. 3 shows a plot corresponding to a schematic cross-section view of the deformed mirror which enables a RoM of 2 to be obtained. The origin of the curve 0,0 corresponds to the center of the deformable mirror 5.

Figure 4:
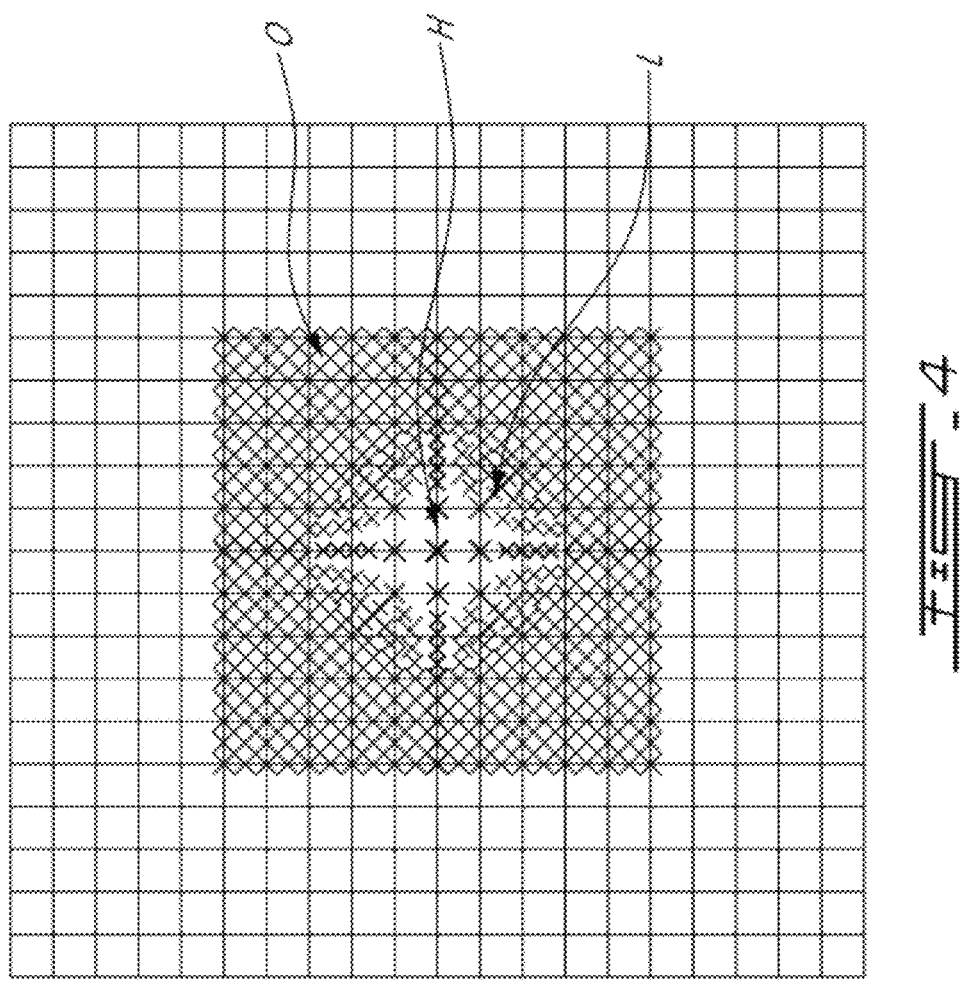
FIG. 4 is a plot showing the image obtained by computer simulation using the deformed mirror shown in FIG. 3, with the magnification represented as the distance between the crosses.

FIG. 4 shows the results of the simulation, using a grid distortion plot. It will be appreciated that, according to the ratio of the distance between crosses in zone H and in the original image O, a RoM of 2 is indeed obtained.

Example 2—First Example of Deformation of the Deformable Mirror According to a Desired Ratio of Magnification Experimental testing was also performed to provide an example of deformation of the deformable mirror 5 to obtain a desired value of magnifying power. In this example, the deformable mirror 5 is a ferrofluidic liquid deformable mirror having a diameter of 100 mm and providing about 4% of reflectivity. For the image producing means 52, a Fujinon HF 12.5 SA-1™ lens, manufactured by Fujifilm (Tokyo, Japan), was used. This lens has a focal length of 12.5 mm and in this example, an f-number of 16 was used. A Guppy F-503C™ camera, manufactured by Allied Vision Technologies (Stadtroda, Germany), was also used.

In this example, the deformable mirror, once deformed, defined an asymmetrical, generally parabolic shape at about its center. This shape was created using a plurality of actuators to define a distorted zone having a diameter of about 24.5 mm.

The scene imaged was a neon light source placed above the deformable mirror 5. The neon light source comprises a diffuser on which a regular pattern is defined. The regular pattern is formed by a series of generally square protrusions, or targets. The difference in resolution between the zone of relatively higher magnification H and the original image may be calculated by counting the number of pixels per each target.

Figure 5:
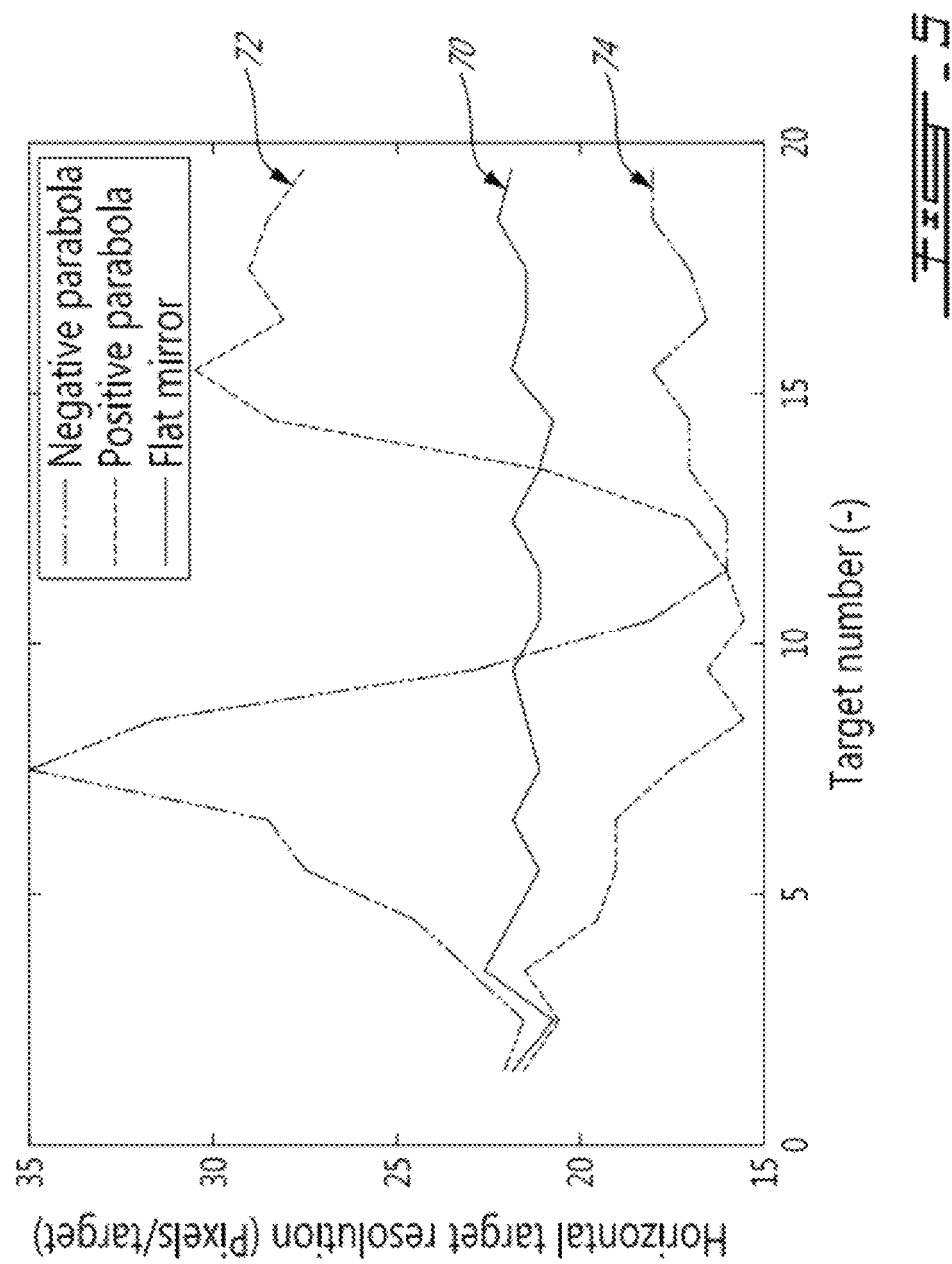
FIG. 5 is a plot showing the number of pixels per target of the image, calculated experimentally in accordance with EXAMPLE 2, plotted as a function of the position on the mirror, for: an undeformed mirror; a deformed mirror defining a positive parabola; and a deformed mirror defining a negative parabola.

The results are presented in FIG. 5. The zone of relatively higher magnification H spreads between targets 15 and 20, as indicated.

In a first test performed, the deformable mirror 5 was undeformed and thus substantially flat. The results of this test correspond to curve 70. It will be appreciated that in this test, the magnification is substantially constant over the whole of the deformable mirror 5.

In a second test performed, part of the deformable mirror was shaped as a "positive" parabola to obtain higher resolution at the center of the distorted zone. The results of this test correspond to curve 72. The ratio of magnification obtained was about 1.32 compared to the undeformed mirror, which is a substantial increase in magnification for zone H.

In a third test performed, part of the deformable mirror was shaped as a "negative" parabola to obtain lower magnification at the center of the distorted zone. The results of this test correspond to curve 74. The ratio of magnification obtained was about 0.80 compared to the undeformed mirror.

Example 3—Second Example of Deformation of the Deformable Mirror According to a Desired Ratio of Magnification In a second example, a commercial camera and lens are used in combination with a ferrofluidic continuous deformable mirror, which is positioned generally horizontally. The mirror has a full diameter of 100 mm and comprises 91 actuators which are used to deform the mirror. In this case, the actuators are located in a central 40-mm diameter region of the deformable mirror.

It will be appreciated that this mirror allows deformation with high amplitudes, of over 1 mm in some cases. In this example, low-current driving electronic controls were used to control the actuators. The low-current driving electronic controls limited the mirror to amplitudes of 150 μm. However, it will be appreciated that using different electronic controls may provide higher amplitudes.

In this example, the maximum amplitude difference from two neighbor actuators is about 50 μm in a separation of 2.8 mm, producing a maximal slope of 1 degree.

Still in this example, a Shack-Hartmann sensor was used to measure amplitude of the deformations of the deformable mirror. In the configuration used, this sensor was limited to measuring amplitudes of about 40 μm on the mirror. The desired shape was first set on the mirror using the electronic controls and then, by scaling the voltage (and thus the current) in the actuators by a constant, higher amplitudes, scaled approximately by this constant, were obtained. The scale factor is therefore the independent variable instead of amplitude in this example.

Alternatively, a different amplitude sensor or configuration may be used to allow measurement of higher amplitudes.

Still in this example, the deformable mirror has a natural reflectivity of about 4%. In one embodiment, a metal liquid-like film layer is deposited on it to achieve a higher reflectivity.

The camera is positioned at a small angle of less than 15 degrees relative to the vertical, which has a negligible effect, as one skilled in the art will appreciate.

The distance $L_0$ between the entrance pupil and the center of the mirror is set to 217 mm. The lens is a f=12.5 mm Fujinon HF 12.5 SA-1™ lens, manufactured by Fujifilm (Tokyo, Japan), with an entrance pupil measured to be 25±1 mm behind the metallic frame on the object side. It has a manually adjustable focus ranging from 0.1 m to infinity and a manually adjustable f-number ranging from 1.4 to 22. For all the following images, an f-number of 16 is used. As for the camera, a 2592×1944 pixels (5 megapixels) AVT Guppy F-503™ manufactured by Allied Vision Technologies (Stadtroda, Germany), having pixels of 2.2 µm, is used.

Figure 6:
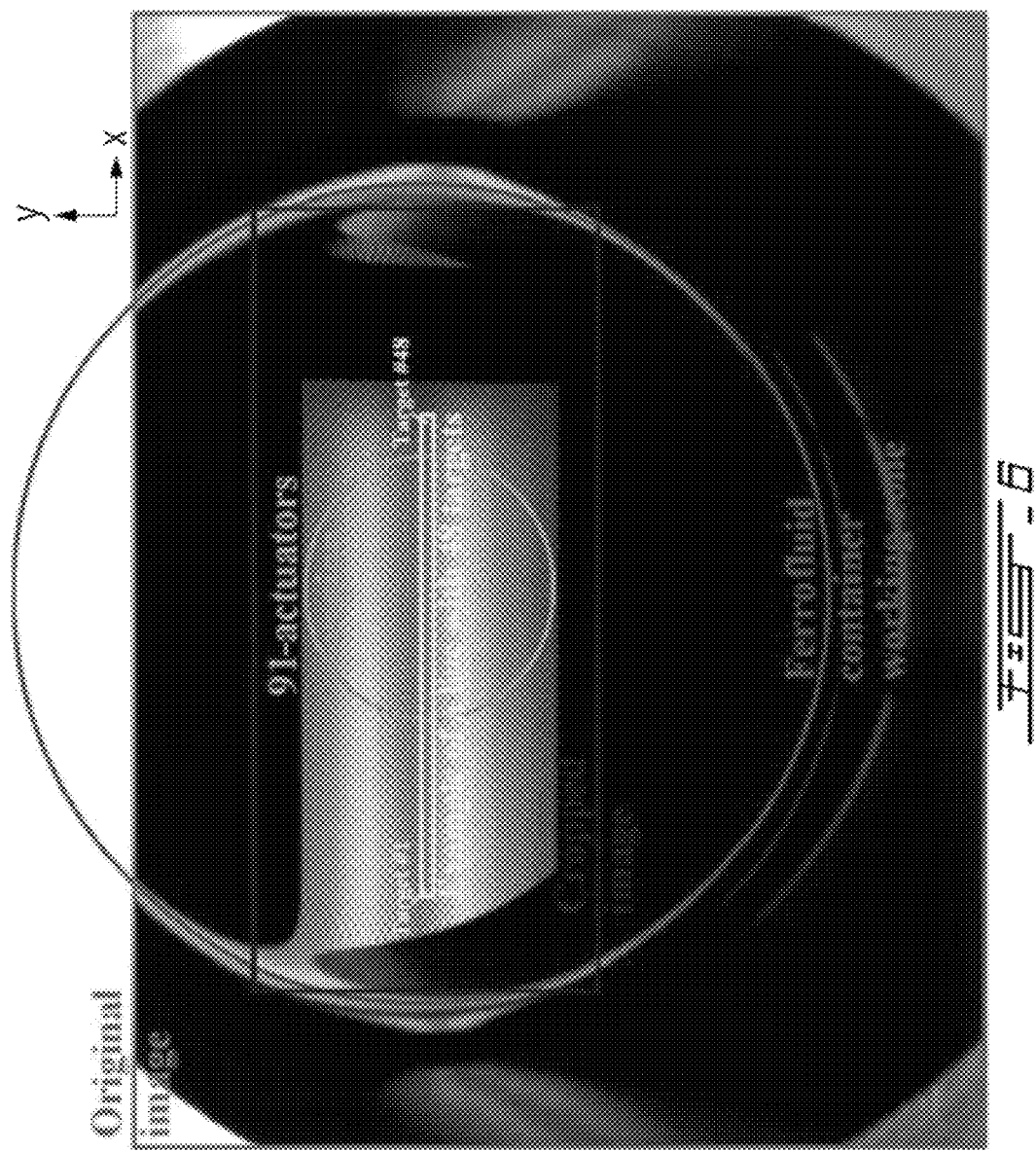
FIG. 6 is a photograph showing a reference image obtained with the deformable mirror in a flat position, using the imaging system shown in FIG. 1.

FIG. 6 shows a reference image obtained with the deformable mirror in a flat position. The test pattern is a ceiling light diffuser, the plastic cover under a neon light, because of its brightness and regularly spaced pattern. Each small square in the regular pattern, as seen in FIG. 6, is used as a target for measurements. All the images are cropped in the same way to show the zone of interest and the region around it.

In this example, the deformed mirror was deformed to create a parabola shaped zone which produces a constant RoM. It will be appreciated that although the RoM is generally constant over the zone of relatively higher magnification H, a zone of relatively lower magnification L is still formed around the zone of relatively higher magnification H, as shown in FIGS. 2B and 2C.

A zone of interest having a diameter 40 mm compared to the full mirror diameter of 100 mm is chosen. The zone of relatively lower magnification L, or zone of "settling back", is relatively small, with the mirror reverting relatively quickly to a flat surface outside the 91-actuator region.

The parabola was first obtained with a scale factor of +1 on the voltages and then this scale factor was varied from −5 to +5 to produce a wide range of amplitude of the parabola.

Figure 7:
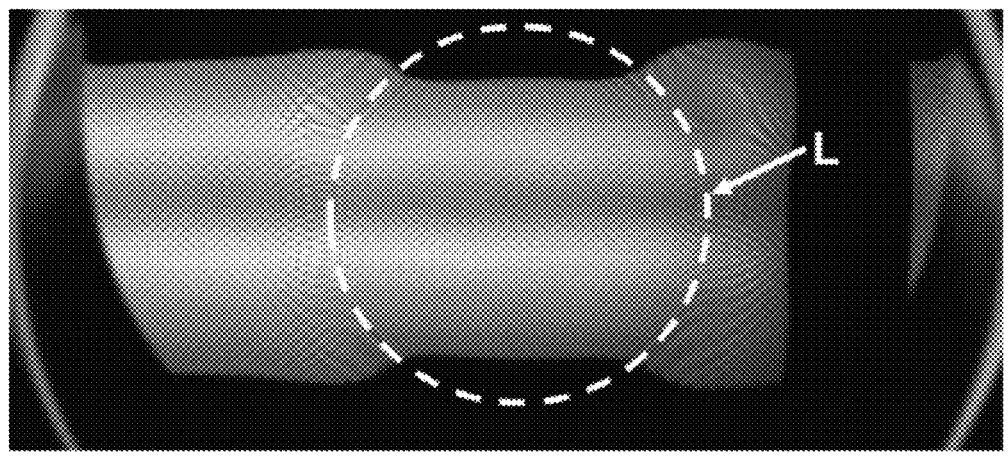
FIG. 7 is a photograph showing an image having one zone of relatively higher magnification, obtained with a mirror having a parabolic deformation using the imaging system shown in FIG. 1, with a scale factor of −5.
Figure 8:
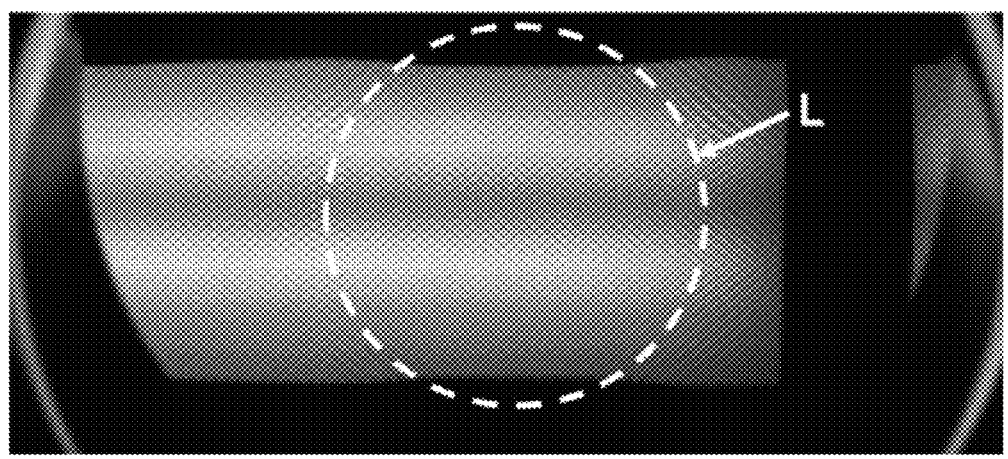
FIG. 8 is a photograph showing an image having one zone of relatively higher magnification, obtained with a mirror having a parabolic deformation using the imaging system shown in FIG. 1, with a scale factor of −1.
Figure 9:
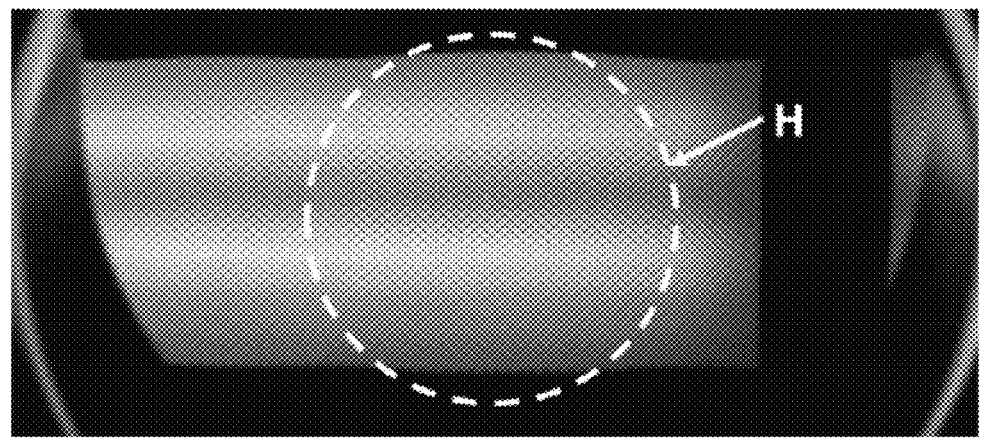
FIG. 9 is a photograph showing an image having one zone of relatively higher magnification, obtained with a mirror having a parabolic deformation using the imaging system shown in FIG. 1, with a scale factor of +1.
Figure 10:
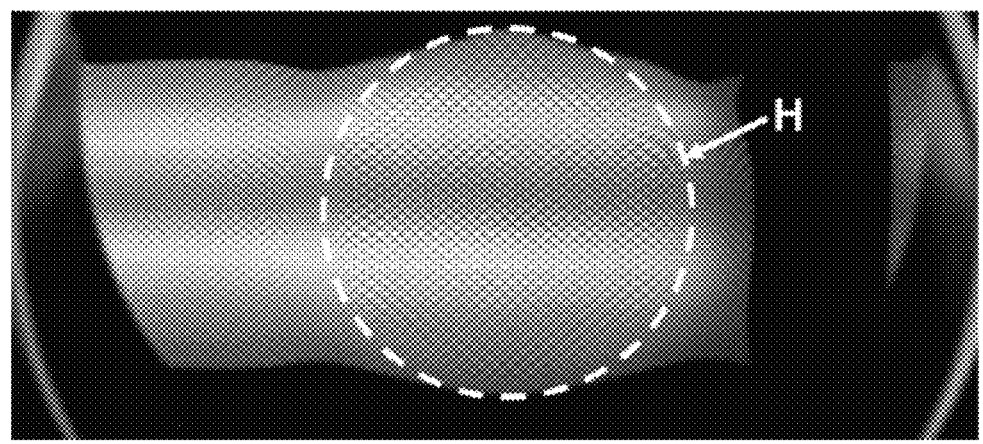
FIG. 10 is a photograph showing an image having one zone of relatively higher magnification, obtained with a mirror having a parabolic deformation using the imaging system shown in FIG. 1, with a scale factor of +5.

The images produced are shown in FIGS. 7, 8, 9 and 10. In FIG. 7, a scale factor of −5 was used. In FIG. 8, a scale factor of −1 was used. In FIG. 9, a scale factor of +1 was used. In FIG. 10, a scale factor of +5 was used. It will be appreciated that since a negative scale factor was used in FIGS. 7 and 8, a zone of relatively lower magnification L was obtained instead of a zone of relatively higher magnification H.

Figure 11:
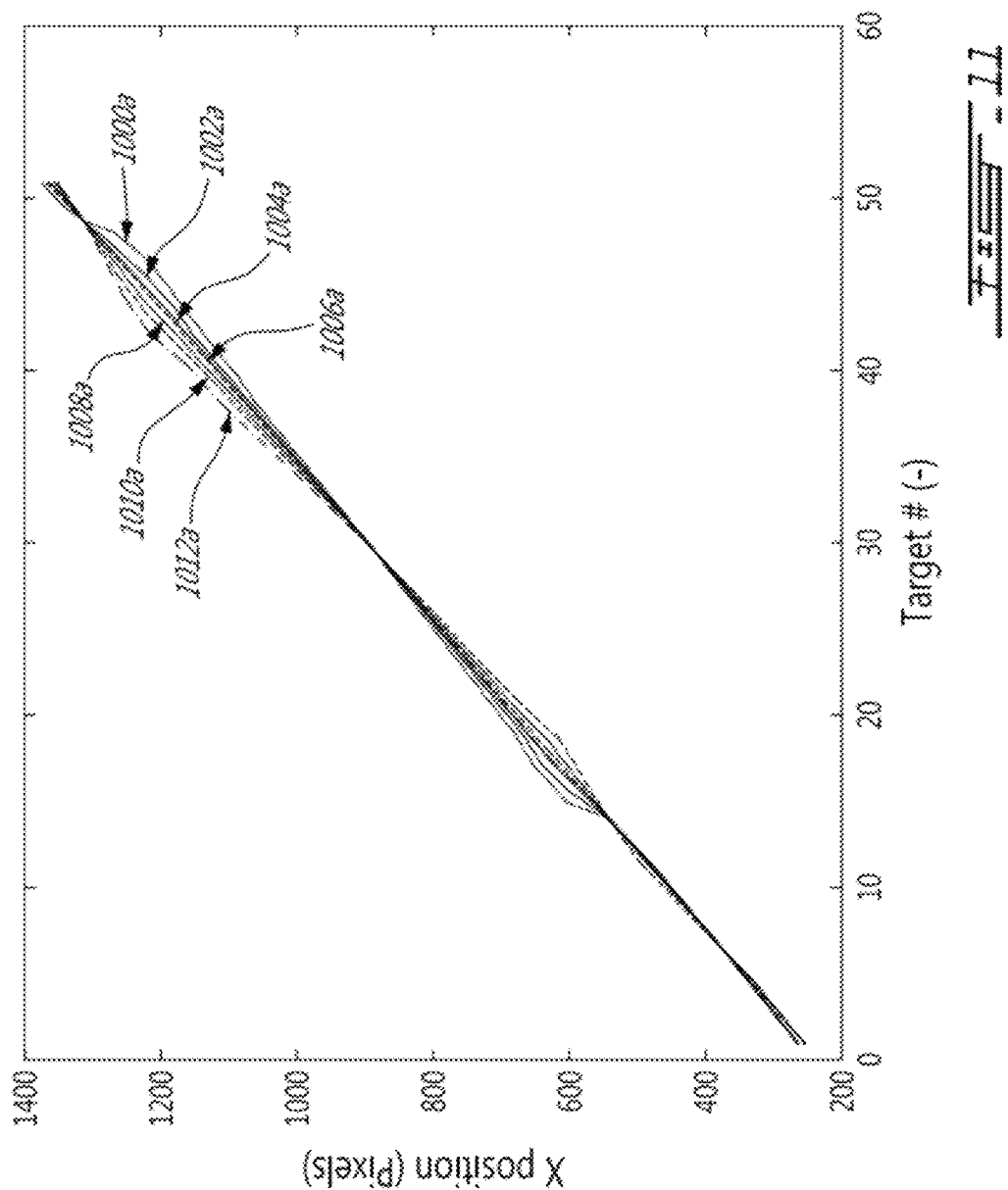
FIG. 11 is a plot showing the positions in pixels, calculated experimentally in accordance with EXAMPLE 3, plotted as a function of the target number for targets on a horizontal line, for various scale factors.
Figure 12:
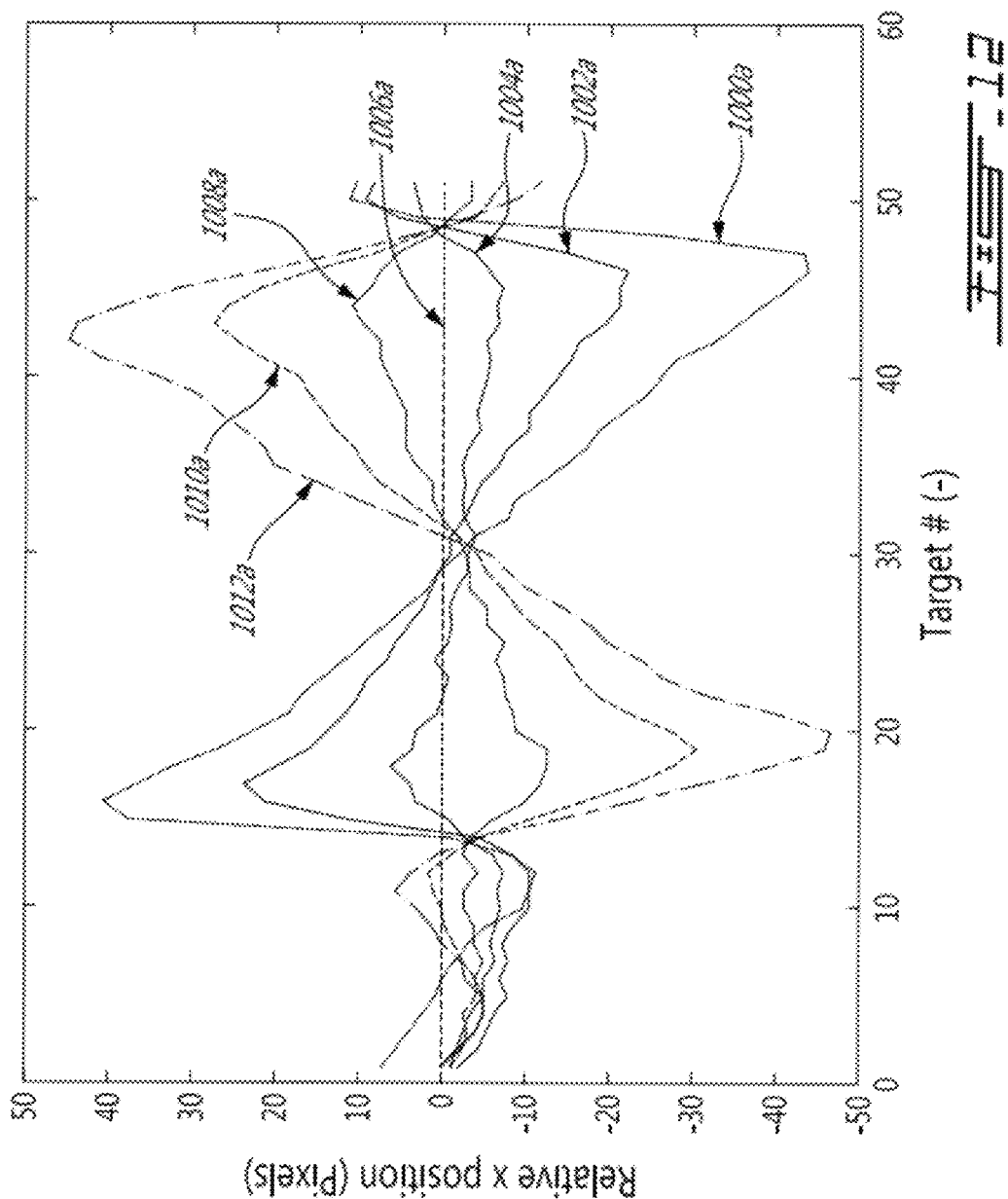
FIG. 12 is a plot showing the relative position in pixels of each target, calculated experimentally in accordance with EXAMPLE 3, with respect to the reference position shown in FIG. 6.

FIGS. 11 and 12 show graphical representations of the results. In these figures, curves 1000*a* and 1000*b* correspond to a scale factor of −5, curves 1002*a* and 1002*b* correspond to a scale factor of −3, curves 1004*a* and 1004*b* correspond to a scale factor of −1, curves 1006*a* and 1006*b* correspond to a scale factor of 0, curves 1008*a* and 1008*b* correspond to a scale factor of +1, curves 1010*a* and 1010*b* correspond to a scale factor of +3 and curves 1012*a* and 1012*b* correspond to a scale factor of +5.

FIG. 11 represents the positions in pixels as a function of the target number for targets on a horizontal line. FIG. 12 represents the relative position of the pixels of each target with respect to the reference shown in FIG. 6.

Figure 13:
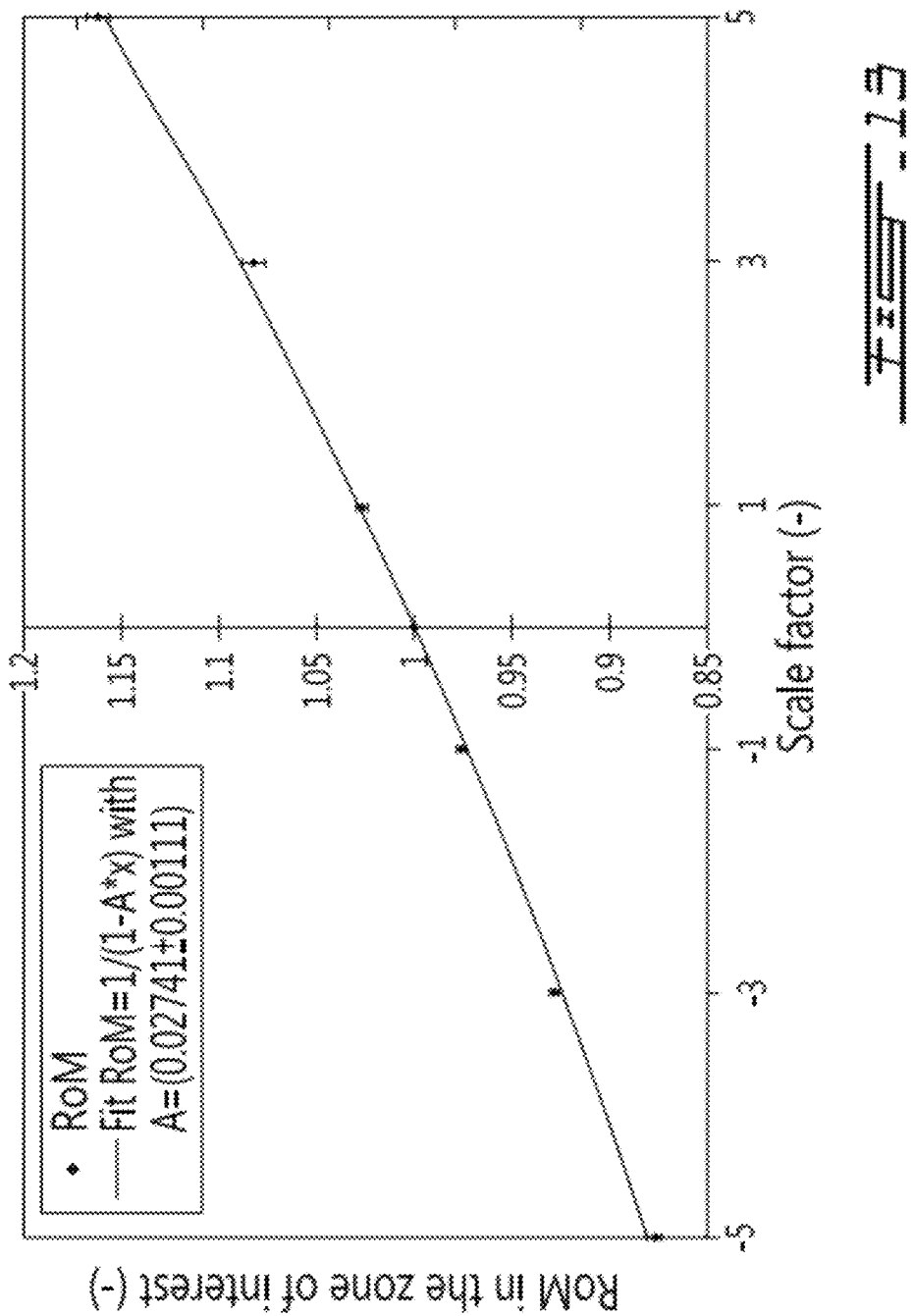
FIG. 13 is a plot showing the ratio of magnification in the zone of relatively higher magnification plotted as a function of the scale factor used, with a trend line showing relatively good correlation with Equation 1.

To get a measurement of the magnification in the central zone of interest, a linear fit is done for each line and the resulting values of the central magnification, in pixels/target, are plotted as a function of the scale factor and the results are shown in FIG. 13. It will be appreciated that the RoM in the zone of interest scales according to Equation 1 with the amplitude of the parabola. For instance, a RoM of 1.17 was produced using the scale factor of +5. Larger RoMs may be produced in a constant zone by placing the camera farther, i.e. increasing $L_0$, and/or using a smaller zone of interest.

It will also be appreciated that, as expected, the RoMs in the transition zone between the central zone of interest and the flat surface of the mirror increase when the zone of interest has a RoM<1 and decrease when the zone has a RoM>1, a consequence that the full FOV is conserved and that the number of pixels in the image is constant.

Example 4—Example of Deformation of the Deformable Mirror According to a Desired (Gaussian) Shape For this example, the setup was similar to the one used for the previous example.

Figure 14:
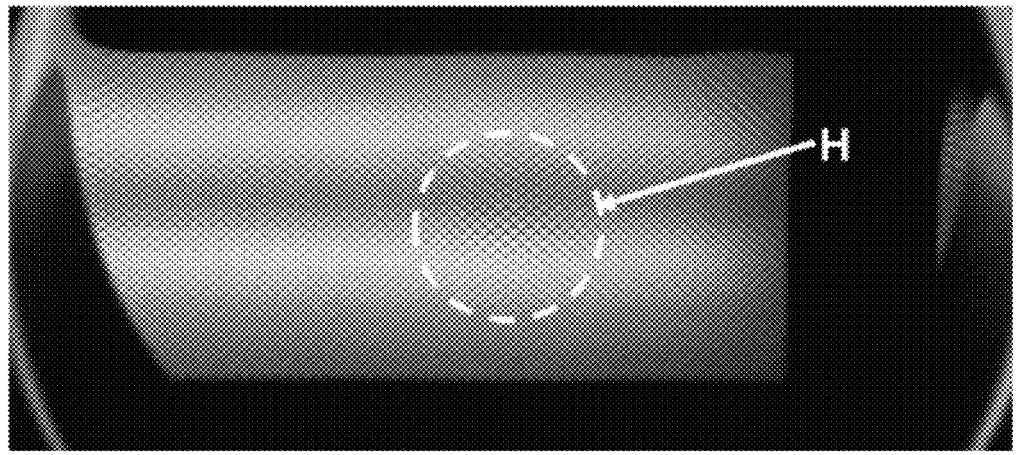
FIG. 14 is a photograph showing an image having one zone of relatively higher magnification, obtained with a mirror having a Gaussian deformation using the imaging system shown in FIG. 1, with a scale factor of 0.5.
Figure 15:
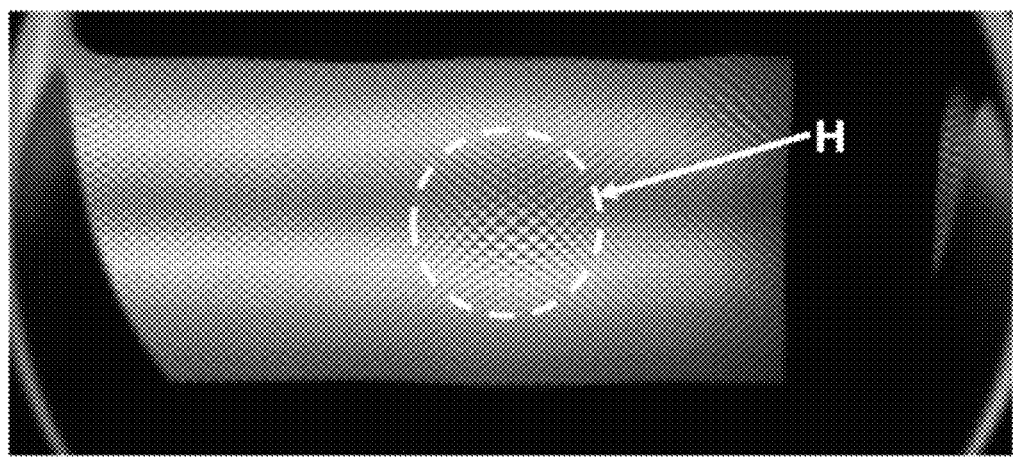
FIG. 15 is a photograph showing an image having one zone of relatively higher magnification, obtained with a mirror having a Gaussian deformation using the imaging system shown in FIG. 1, with a scale factor of 1.0.
Figure 16:
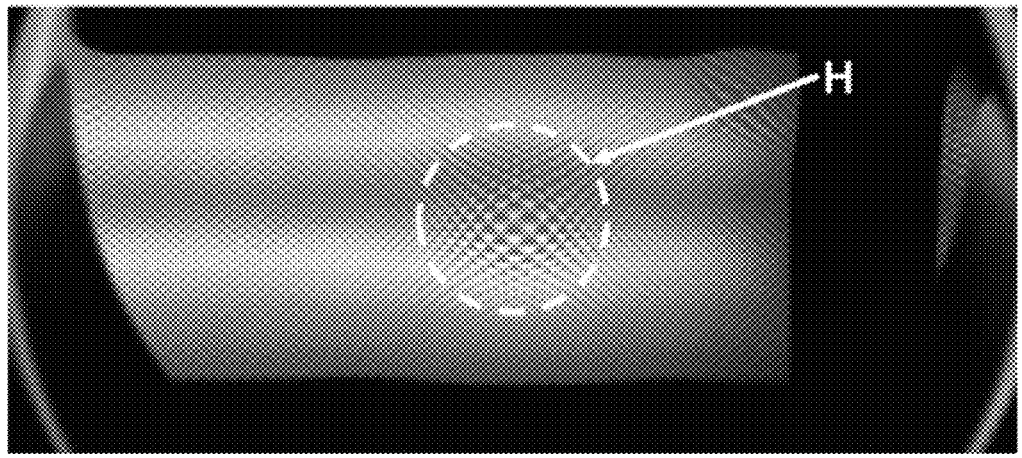
FIG. 16 is a photograph showing an image having one zone of relatively higher magnification, obtained with a mirror having a Gaussian deformation using the imaging system shown in FIG. 1, with a scale factor of 1.3.
Figure 17:
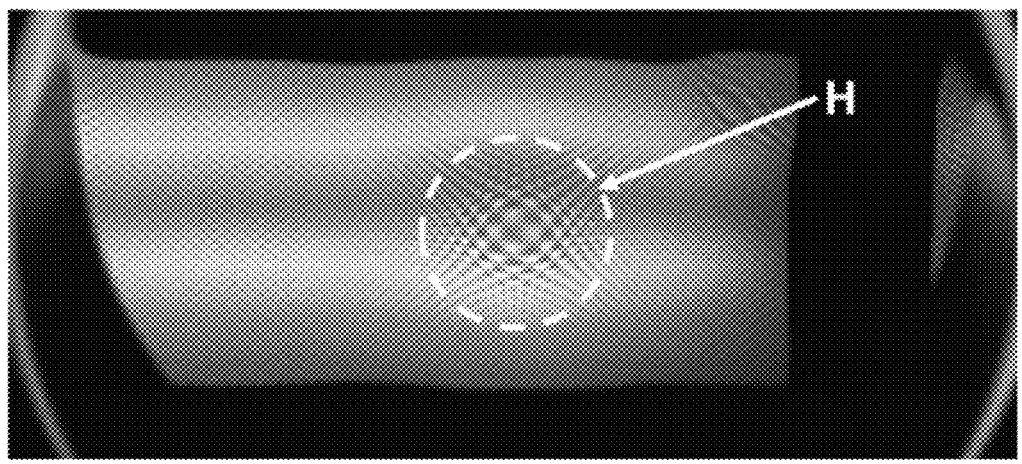
FIG. 17 is a photograph showing an image having one zone of relatively higher magnification, obtained with a mirror having a Gaussian deformation using the imaging system shown in FIG. 1, with a scale factor of 1.5.

A Gaussian shaped deformation on the mirror will produce a region of variable magnification, with a maximum in the center. A Gaussian shaped deformation was produced and then was scaled to obtain different magnifications. FIGS. 14, 15, 16 and 17 shows images obtained using different scale factor. In FIG. 14, a scale factor of 0.5 was used. In FIG. 15, a scale factor of 1.0 was used. In FIG. 16, a scale factor of 1.3 was used. In FIG. 17, a scale factor of 1.5 was used. The zone of relatively higher magnification H is shown generally in these figures. As explained above, the RoM is not constant over the entire zone of relatively higher magnification H in this case.

Figure 18:
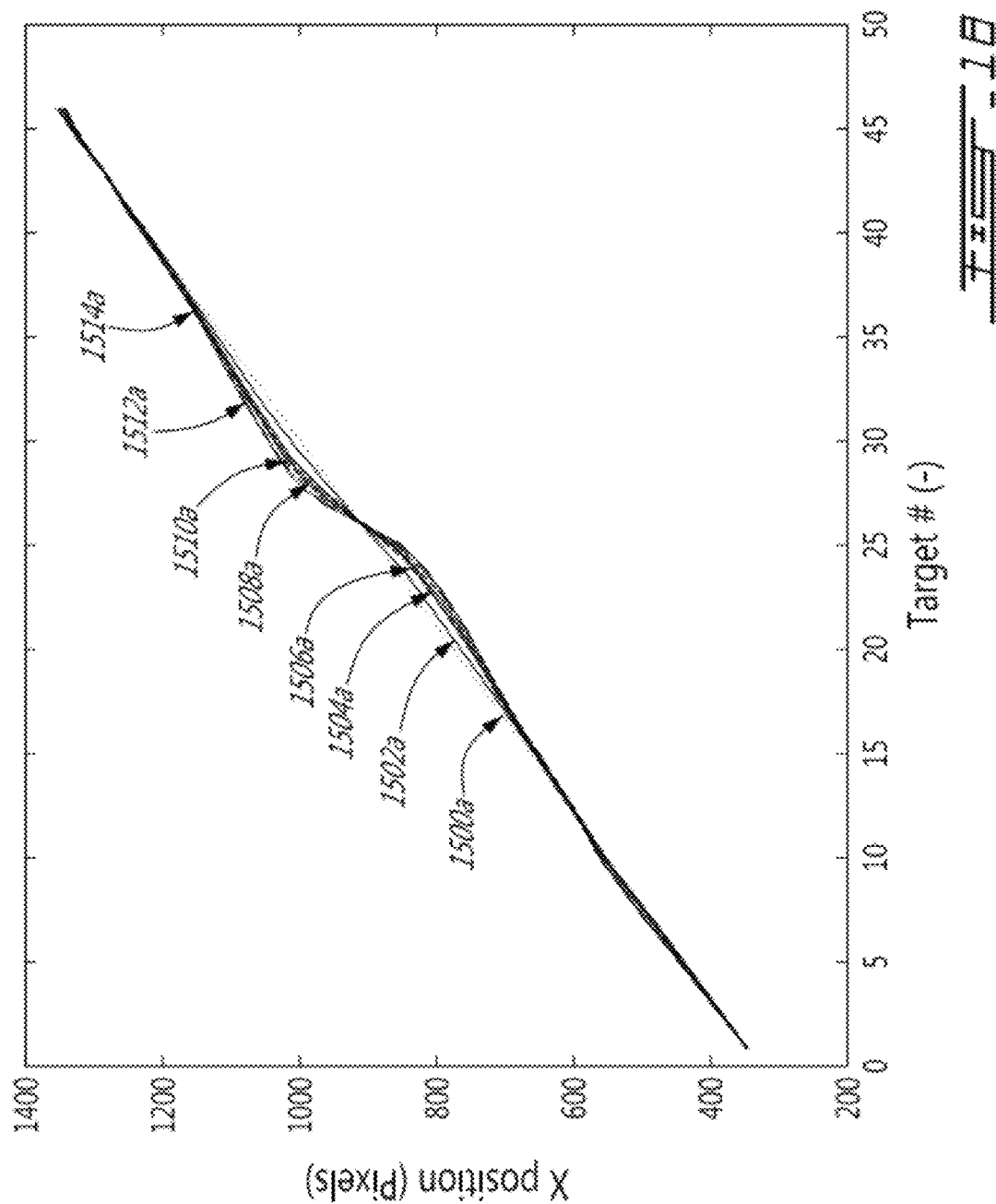
FIG. 18 is a plot showing the positions in pixels, calculated experimentally in accordance with EXAMPLE 4, plotted as a function of the target number for targets on a horizontal line, for various scale factors.

FIG. 18 shows the position of each target on a horizontal line passing by the center of the zone of interest.

Figure 19:
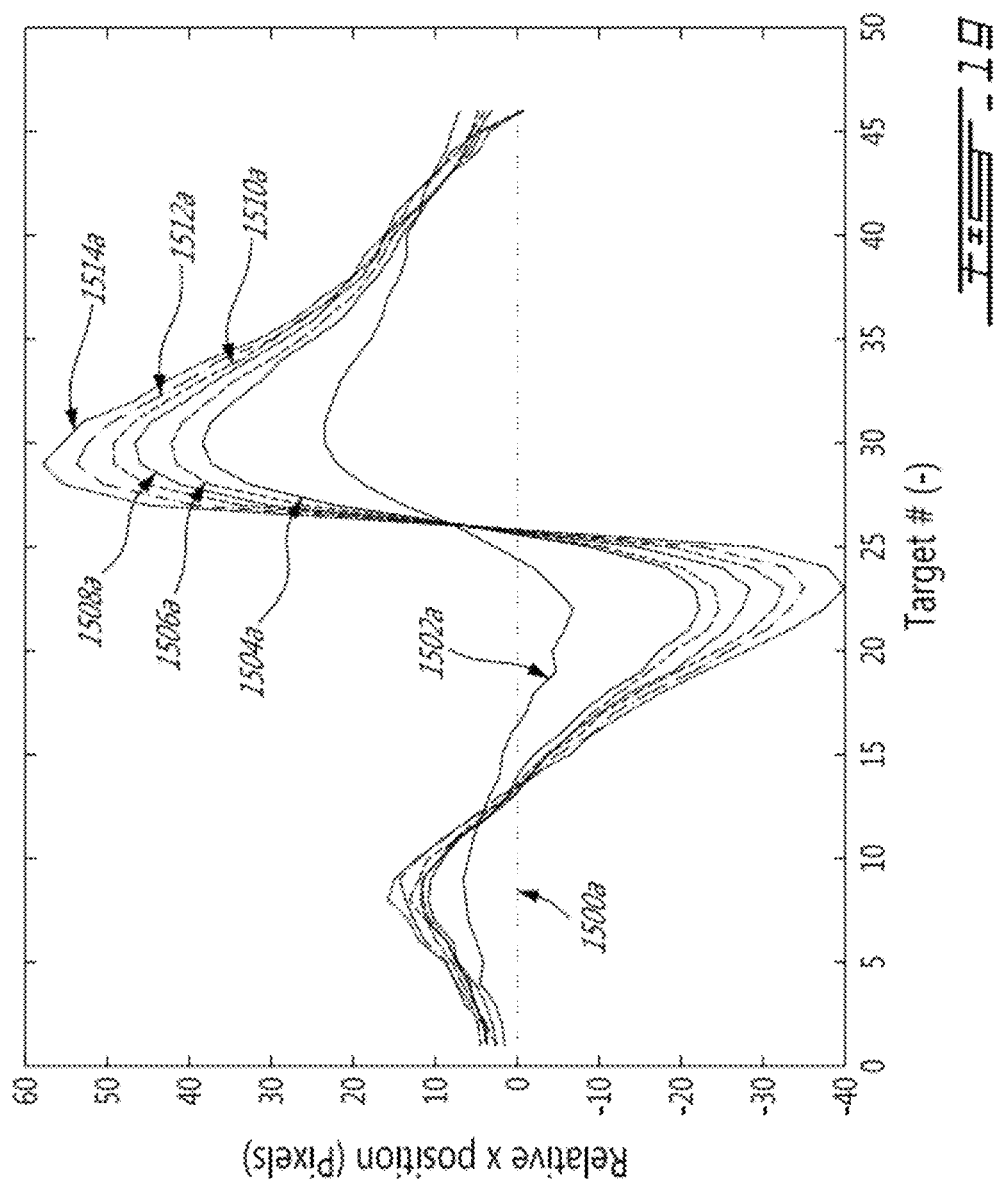
FIG. 19 is a plot showing the relative position in pixels of each target, calculated experimentally in accordance with EXAMPLE 4, with respect to the reference position shown in FIG. 6.

To clearly see the magnification at the center, the derivative of this graph is taken and only the central zone is shown in FIG. 19. For numerical differentiation, a sampling of two (2) measurements per target is used and the magnification is obtained by multiplying the differences by a factor of 2. The results are then divided by the original magnification to get the RoM. By smoothing this figure, it shows that a RoM up to about 3.4 is achieved in the center when the scale factor is 1.5.

Figure 20:
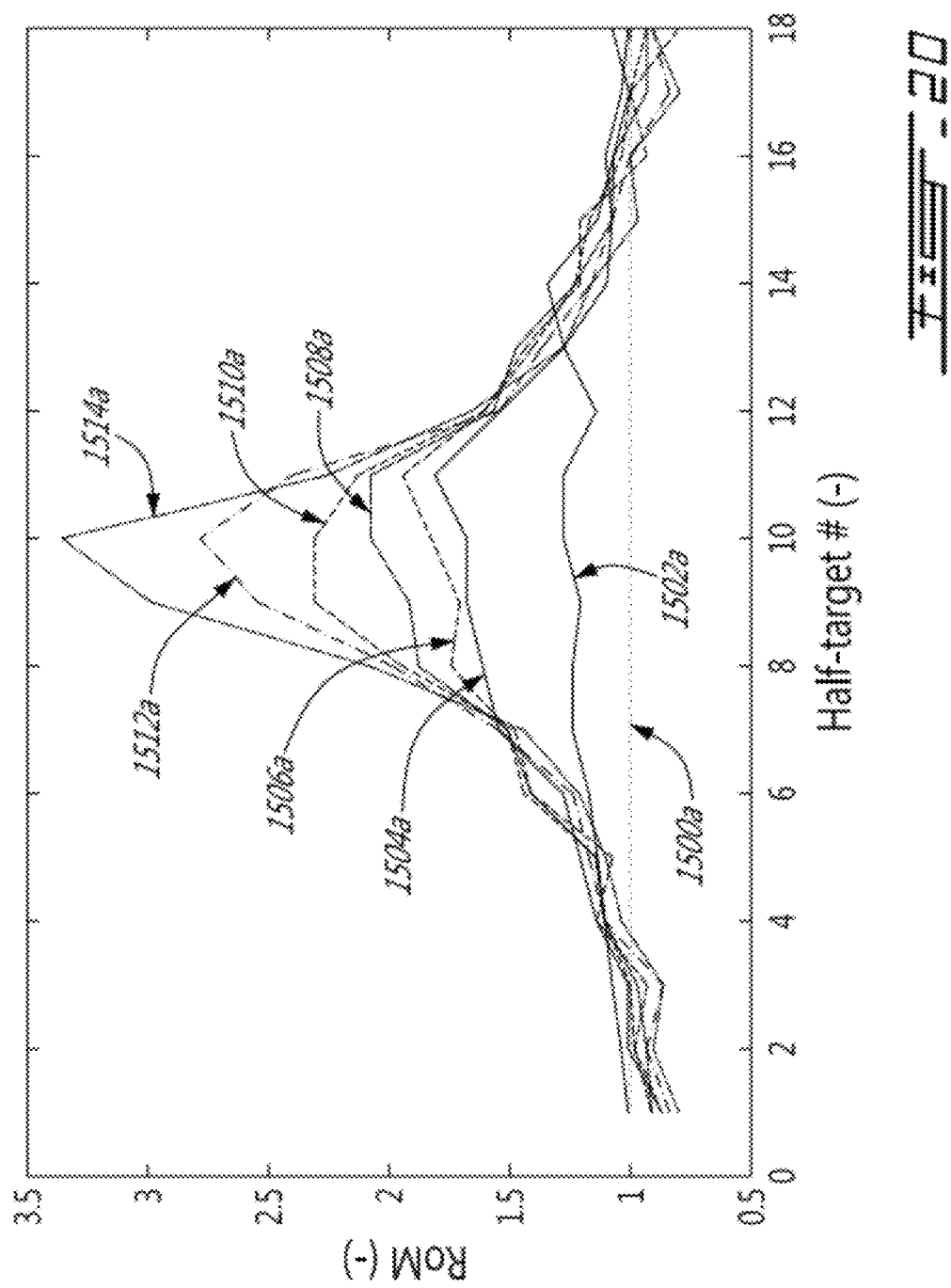
FIG. 20 is a plot showing the ratio of magnification, calculated experimentally in accordance with EXAMPLE 4, plotted as a function of the target number for targets on a horizontal line, for various scale factors.

FIG. 20 shows the ratio of magnification, calculated experimentally in accordance with EXAMPLE 4, plotted as a function of the target number for targets on a horizontal line, for various scale factors.

It will be appreciated that the apparently higher magnification achieved with a Gaussian bump rather than with a parabola is a consequence of having a smaller region needing a high curvature and thus easier to produce.

Other Embodiments

Figure 21:
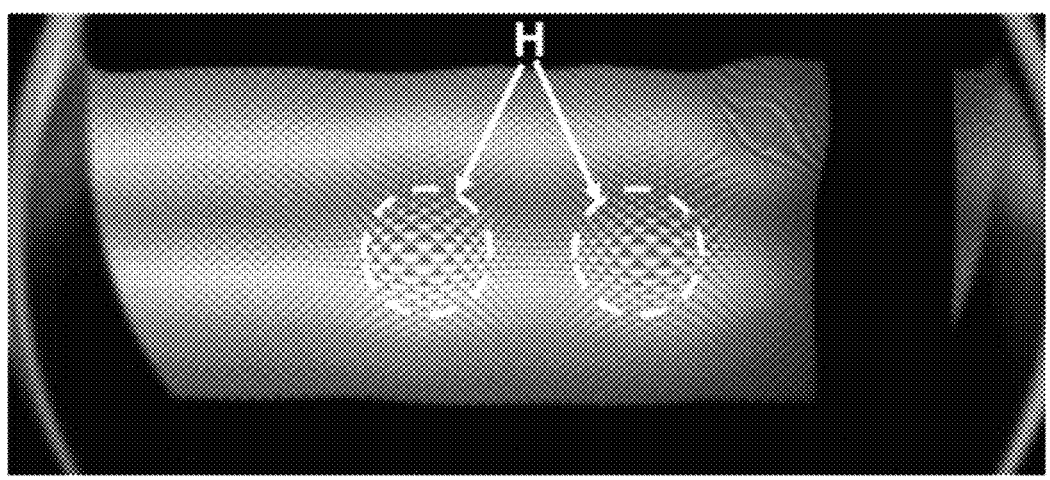
FIG. 21 is a photograph showing an image having two zones of relatively higher magnification, obtained with a mirror having two Gaussian deformations using the imaging system shown in FIG. 1.

In one embodiment, a plurality of modified portions may be formed on the deformable mirror 5, resulting in a plurality of zones of magnification in the image. In FIG. 21, for example, there is shown an image produced by a deformable mirror having two modified portions. In this case, both modified portions are Gaussian-shaped. The image has two (2) zones of relatively higher magnification H separated by a zone of relatively lower magnification. The zone of relatively higher magnification H is shown generally in these figures. As explained above, the RoM is not constant over the entire zone of relatively higher magnification H in this case.

It will be appreciated that each modified portions may be shaped differently, resulting in each zone of relatively higher magnification H having a different RoM.

It will further be appreciated that the imaging system 50 may be configured differently. For instance, the optical means 54 may be distinct from the lens system 9 or alternatively, may be a part of the lens system 9.

In one embodiment, the optical means 54 is instead an active optical device such as a spatial light modulator (SLM) made with liquid crystal (LC) or a segmented deformable mirror (DM).

Alternatively, the optical means 54 may also include a fixed form optical component such a mirror or refractive component which is movable. In this embodiment, the imaging system 50 further comprises actuating means operatively coupled to the optical means for moving the optical means into a desired configuration. The actuating means may be configured to cause rotation and/or translation of the optical means 54 to change the position of the magnified or distorted zone within the FOV.

In one embodiment, the optical means 54 is instead a liquid lens where the lens shape is changed according to the liquid properties or to the index of refraction of the liquid injected into the optical means.

FIG. 22 shows an imaging system 100, in accordance with an alternative embodiment. In this embodiment, the optical means 54 comprises a transmissive active optical member 102, such as a liquid crystal spatial light modulator or any other means of dynamically modifying the direction of rays. In the illustrated embodiment, a lens 104 is further added between the incoming rays 106 and the active optical member 102, enlarging the field of view for a given size of deformable optics, also helping on the angular shift requirements needed for a desired magnification.

It will be appreciated that increasing the curvature, or optical power, of the optical means 54 may cause the rays to become defocused at the image detector 12. In one embodiment, image quality may be conserved by adjusting the iris 11 to control the f-number of the system, which is the ratio of the focal length by the diameter of the entrance pupil 10. By changing the diameter of this iris 11, it may be possible to limit rays with aberrations of defocus under 0.25 times the wavelength of light. It will be appreciated that this contributes to maintaining a relatively good image quality and to keep the image in focus.

The image processing means 56 comprises a processing unit 14 connected to the detector 12. A screen 16, a computer 17 and control means 19 are also provided.

In one embodiment, correcting means for correcting optical aberrations such as defocus is added to allow a smaller f-number. The correcting means may comprise an additional active optical component which can be used to compensate for defocus or other optical aberrations produced within the optical system by modifying the optical path difference, or OPD, of the wavefront in the exit pupil of the optical system, thereby providing a higher range of local magnification as required by applications. Alternatively, the correcting means may instead be a phase plate, such as a cubic phase mask, positioned in the IRIS plane, which introduces controlled degradation of the image quality that can be recovered by proper digital deconvolution. This technique is known in the art as "wavefront coding".

FIG. 23 shows an imaging system 150, in accordance with yet another embodiment. In this embodiment, the imaging system 150 is configured as a projection system comprising a light source 152, scanning means 154 and optical means 166. This scanning means 154 comprises any means to modify the direction of rays in such a way that the whole object is scanned. In the illustrated embodiment, the scanning FOV is the angular range comprised between rays 162 and 164. It will be appreciated that the rays 162, 164 are merely shown as example and that other rays may be produced between rays 162 and 164.

An example of operation of the imaging system 150 will now be described. The light source 152 may for instance be a laser. For example, light 156 from the laser is first oriented towards an edge of the optical means 166, producing ray 162. The light 156 is then moved in a sweeping fashion across the surface of the optical means 166 until it reaches the opposite edge of the optical means 166 after a predetermined period of time. When the light 156 reaches this position, it produces ray 164. Since the light 156 is moving across the optical means 166, a plurality of rays, not shown, are also produced over the certain period of time. At a certain moment, only a single ray is therefore produced and oriented by the optical means 166 towards a scene or object to be scanned, not shown. A sensor, also not shown, may be placed near the scene or object to measure a certain characteristic of the scene or object in response to the light being directed towards it, such as fluorescence.

It will be appreciated that even if the direction of the rays is reversed in the imaging system 150 compared to the imaging system 50 shown in FIG. 1, the optical means 166, which comprises a deformable mirror in this embodiment, allows changing the ray of light 156 to produce ray 158 instead of ray 160, for instance, in the same manner as described above. Since the scanning speed determined by the scanning means 154 is constant, it would take the same amount of time to scan from 162 to 160 with the mirror in a flat shape than it would take to scan from 162 to 158 when the mirror is deformed. By scanning a smaller object angle in the same amount of time, the resulting is a higher sampling of the object, which is analogous to a higher magnification in the imaging system 50. A screen 16, a computer 17 and control means 19 are also provided. The imaging system described herein is therefore reversible.

Although the above description relates to example embodiments as presently contemplated by the inventors, it will be understood that the invention in its broad aspect includes mechanical and functional equivalents of the elements described herein.

We claim:

1. An imaging system for producing an image of a scene, the image having at least one distorted zone, the imaging system comprising:

image producing means including a detector for producing the image of the scene within a field-of-view;

active optical means for orienting light from the scene towards the detector, a configuration of the active optical means being adapted to be changed between an inactivated configuration and an activated configuration, said active optical means having a base optical power in said inactivated configuration, said active optical means including at least one modified portion formed in said active optical means in said activated configuration, each one of the at least one modified portion in said active optical means having a higher and a lower modified optical power different from the base optical power of a rest of said active optical means in said activated configuration, said field-of-view of said detector being kept constant in said inactivated configuration and said activated configuration; and control means operatively connected to the active optical means for changing the configuration of the active optical means for forming therein the at least one modified portion;

wherein said at least one distorted zone is created on the image produced by the detector, in use, upon change of the configuration of the active optical means in the activated configuration by the control means, each of said at least one distorted zone having a magnified zone and a reduced zone, said magnified zone having an increased magnification higher than an original magnification and said reduced zone having a decreased magnification lower than said original magnification and a rest of said image having said original magnification and in use, upon change of the configuration of the active optical means in the inactivated configuration by the control means, said image has said original magnification.

2. The imaging system of claim 1, wherein the active control means are further adapted for modifying the position of the at least one modified portion on the active optical means to thereby modify the position of the at least one distorted zone on the image.

3. The imaging system of claim 1, wherein the active optical means comprise a deformable mirror having a continuous membrane.

4. The imaging system of claim 1, wherein the active optical means comprise a segmented deformable mirror.

5. The imaging system of claim 1, wherein the active optical means comprise a liquid crystal spatial light modulator.

6. The imaging system of claim 1, wherein the active optical means is movable; further wherein the imaging system comprises actuating means operatively coupled to the active optical means for moving the active optical means into a desired configuration.

7. The imaging system of claim 1, wherein the active optical means comprise:
    a first optical member for creating the at least one distorted zone on the image; and
    a second optical member operatively connected to the control means, the second optical member being configurable to modify the at least one distorted zone on the image.

8. The imaging system of claim 7, wherein the first optical member comprises a fixed form optical element.

9. The imaging system of claim 7, wherein the first optical member comprises an active optical element.

10. The imaging system of claim 7, wherein the second optical member comprises an active optical element.

11. The imaging system of claim 7, wherein the second optical member is movable; and wherein the imaging system comprises actuating means operatively coupled to the second optical member for moving the second optical member into a desired configuration.

12. The imaging system of claim 1, further comprising image processing means operatively connected to the image producing means for converting the at least one distorted zone into at least one undistorted zone having a modified number of pixels.

13. The imaging system of claim 1 further comprising correcting means for correcting optical aberrations.

14. The imaging system of claim 13, wherein the correcting means comprise an active optical element.

15. The imaging system of claim 13, wherein the correcting means comprise a phase mask.

16. The imaging system of claim 13, wherein the correcting means comprise digital processing.

17. The imaging system of claim 1, wherein the imaging system is reversible.

18. A scanning system for producing a scan of a scene, said scan of the scene having at least one distorted zone, the scanning system comprising:
    a light source;
    scanning means for projecting light from the light source in a sweeping fashion across a predetermined range in a predetermined amount of time for producing said scan of the scene within a scanning field-of-view;
    active optical means for orienting the projected light from the scanning means towards the scene, a configuration of the active optical means being adapted to be changed between an inactivated configuration and an activated configuration, said active optical means having a base optical power in said inactivated configuration, said active optical means including at least one modified portion formed in said active optical means in said activated configuration, each one of the at least one modified portion in said active optical means having a higher and a lower modified optical power different from the base optical power of a rest of said active optical means in said activated configuration;
    said scanning field-of-view of said scanning means being kept constant in said inactivated configuration and said activated configuration; and
    control means operatively connected to the active optical means for changing the configuration of the active optical means for forming therein the at least one modified portion;
    wherein, said at least one distorted zone is created in said scan, in use, upon change of the configuration of the active optical means in the activated configuration by the control means, each of said at least one distorted zone having a magnified zone and a reduced zone, said magnified zone having an increased magnification higher than an original magnification and said reduced zone having a decreased magnification lower than said original magnification and a rest of said scan having said original magnification and in use, upon change of the configuration of the active optical means in the inactivated configuration by the control means, said scan has said original magnification.

19. The scanning system of claim 18, wherein the active optical means comprise a fixed form optical element.

* * * * *